(12) United States Patent
Jennings et al.

(10) Patent No.: US 8,798,385 B2
(45) Date of Patent: Aug. 5, 2014

(54) SUPPRESSING INTERFERENCE IN IMAGING SYSTEMS

(75) Inventors: William T. Jennings, Plano, TX (US); José M. Gutiérrez, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 1142 days.

(21) Appl. No.: 12/371,661

(22) Filed: Feb. 16, 2009

(65) Prior Publication Data

US 2010/0209014 A1  Aug. 19, 2010

(51) Int. Cl.
*G06K 9/40* (2006.01)

(52) U.S. Cl.
USPC .......................................... 382/254; 382/275

(58) Field of Classification Search
USPC ................................. 382/254–275
See application file for complete search history.

(56) References Cited

U.S. PATENT DOCUMENTS

| | | | |
|---|---|---|---|
| 5,446,461 A | 8/1995 | Frazier | |
| 5,706,817 A | 1/1998 | Song et al. | 128/661.09 |
| 5,835,054 A | 11/1998 | Warhus et al. | |
| 6,052,484 A * | 4/2000 | Kobayashi | 382/195 |
| 6,755,787 B2 | 6/2004 | Hossack et al. | 600/447 |
| 6,970,194 B1 * | 11/2005 | Smith | 348/247 |
| 7,148,836 B2 | 12/2006 | Romero et al. | |
| 7,319,760 B2 | 1/2008 | Sekine et al. | 381/17 |
| 2004/0051908 A1 * | 3/2004 | Curry et al. | 358/3.08 |
| 2004/0138560 A1 | 7/2004 | Paladini | |
| 2004/0264797 A1 * | 12/2004 | Lippincott et al. | 382/260 |
| 2005/0147313 A1 * | 7/2005 | Gorinevsky | 382/255 |
| 2005/0232483 A1 * | 10/2005 | Kato et al. | 382/171 |
| 2008/0165046 A1 | 7/2008 | Fullerton et al. | |

OTHER PUBLICATIONS

Withington et al., "Enhancing Homeland Security with Advanced UWB Sensors" IEEE Microwave Magazine, pp. 51-58 Sep. 2003.
Sostanovsky et al., "UWB Radar Imaging System with Two-element Receiving Array Antenna," 5th International Conference on Antenna Theory & Technique, Kiev, Ukraine, pp. 357-360 May 2005.
Office Action, U.S. Appl. No. 12/098,499, inventors William T. Jennings et al., 15 pages. Sep. 9, 2009.
U.S. Appl. No. 12/098,499, by inventors William T. Jennings et al., entitled "Generating Images According to Points of Intersection for Integer Multiples of a Sample-Time Distance,",35 pages. Filed Apr. 7, 2008.
Willis, Advances in Bistatic Radar, 3 pages. 2007.
Office Action, U.S. Appl. No. 12/098,499, filed Apr. 7, 2008, inventors William T. Jennings et al., 15 pages. Jun. 25, 2010.

\* cited by examiner

*Primary Examiner* — Alex Liew
(74) *Attorney, Agent, or Firm* — Burns & Levinson LLP; Joseph M. Maraia

(57) ABSTRACT

According to one embodiment, an imaging system includes an interface, a plurality of filters, and a processor. The interface receives data blocks. The processor associates each data block with a processing step list that represents a filter chain that has at least a subset of the filters coupled in sequence. The processor filters each data block according to the filter chain represented by the associated processing step list.

17 Claims, 5 Drawing Sheets

SUPPRESSING INTERFERENCE IN IMAGING SYSTEMS

GOVERNMENT FUNDING

The U.S. Government may have certain rights in this invention as provided for by the terms of Contract No. H94003-04-D-0006 awarded by the Defense Microelectronics Agency (DMEA).

TECHNICAL FIELD

This invention relates generally to the field of imaging systems and more specifically to suppressing interference in imaging systems.

BACKGROUND

Imaging systems generate images of objects. An imaging system typically receives signals reflected from an object and generates an image of the object from the signals. Certain imaging devices may generate images of objects that are on the other side of a barrier. Some of these devices, however, cannot generate satisfactorily clear images of the object.

SUMMARY OF THE DISCLOSURE

In accordance with the present invention, disadvantages and problems associated with previous techniques for suppressing interference in imaging systems may be reduced or eliminated.

According to one embodiment, an imaging system includes an interface, a plurality of filters, and a processor. The interface receives data blocks. The processor associates each data block with a processing step list that represents a filter chain that has at least a subset of the filters coupled in sequence. The processor filters each data bloc according to the filter chain represented by the associated processing step list.

Certain embodiments of the invention may provide one or more technical advantages. A technical advantage of one embodiment may be that a filter system of an imaging system includes a filter chain with several filters. The filters may be selected in accordance with the interference to be suppressed. In addition, the order of the filters may be changed in accordance with the interference.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
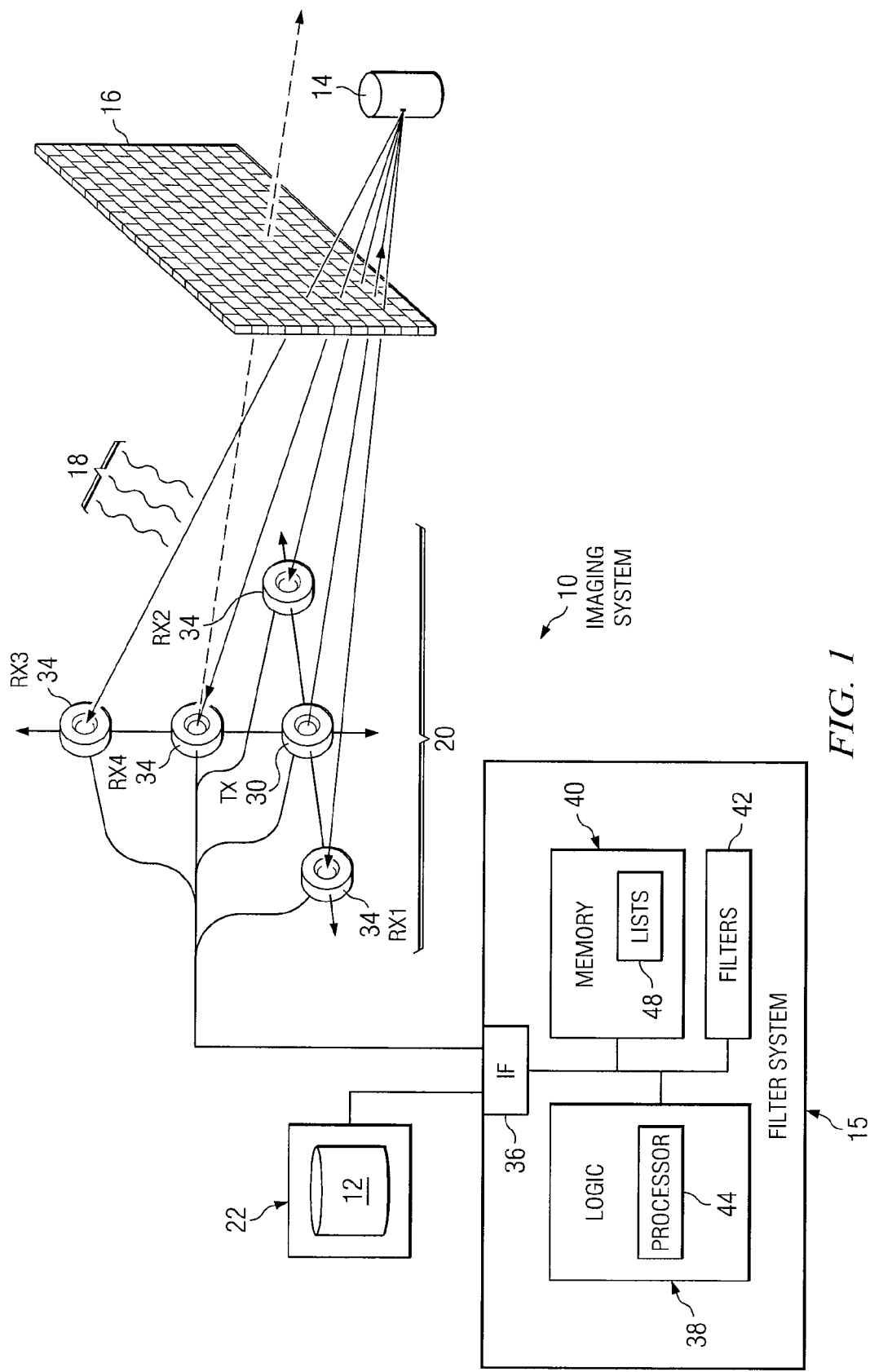
FIG. 1 illustrates an embodiment of an imaging system that generates an image of object, even in the presence of interference.

FIG. 1 illustrates an embodiment of an imaging system 10 that generates an image 12 of object 14, even in the presence of interference 18. Imaging system 10 includes a reconfigurable filter system 15. In certain embodiments, filter system 15 receives data blocks and associates one or more data blocks with a processing step list that represents a filter chain comprising filters coupled in sequence. Filter system 15 filters data blocks according to the filter chains represented by the associated lists.

Object 14 represents any suitable physical object that can reflect signals. A reflected signal carries image information about the point of object 16 from which the signal was reflected. Image information derived from multiple signals may be used to generate image 12 of object 14. When signals are reflected from moving targets, Doppler image processing may be used to generate image 12.

In certain situations, an obstruction 16 may be disposed between imaging system 10 and object 14. Obstruction 16 represents a physical barrier that blocks one or more frequencies of electromagnetic radiation. For example, obstruction 16 may block visible light, such that object 14 on one side of obstruction 16 is not visible to a viewer on the other side.

Interference 18 represent signals that interfere with and degrade resulting image 12. Example interference sources include wireless systems that use allocated spectral bands that overlay ultrawideband (UWB) bandwidth. Interfering signals 18 may include combinations of narrowband and/or wideband signals from any of a variety of pulse or other modulated signal types.

Image 12 represents a visual (such as optical) representation of object 14. Image 12 may comprise one or more images, for example, a still photograph or a sequence of images that form a video. Image 12 may have two or three spatial dimensions.

In the illustrated embodiment, imaging system 10 includes an antenna array 20, a filter system 15, and an image display system 22 coupled as shown. In certain embodiments, antenna array 20 receives signals reflected from object 14, filter system 15 filters data from samples of the signals, and image display system 22 generates image data from the filtered data and displays image 12 generated from the image data.

In certain embodiments, antenna array 20 includes any suitable number of antenna elements, where an antenna element transmits and/or receives a signal. In the illustrated embodiment, the antenna elements include one or more transmitters 30 (illustrated as TX) and one or more receivers 34 (illustrated as RX1, RX2, RX3, and RX4). In one embodiment, antenna array 20 may be attached to a vehicle capable of moving, and may itself move with respect to the vehicle.

In certain embodiments, transmitter 30 transmits very sharp discrete pulses, as in impulsive radar. The duration of the pulse is typically very short relative to the round-trip distance. Receiver 34 may sample the received signal, and may sample the signal at a fixed sampling rate.

In certain embodiments, transmitter 30 transmits ultra-wideband (UWB) signals. Ultra-wideband may refer to a bandwidth exceeding the lesser of 500 MHz or 20% of the arithmetic center frequency. UWB signals comprise a coherent wide-relative-bandwidth propagation of pulses. Regulations may require that UWB signals be low powered so the UWB signals do not interfere with existing allocated bandwidths. Also, pulse may occur at low repetition rates, such as repetition rates of $5 \times 10^5$ pulses per second or less, down to sporadic, occasional pulses.

In the illustrated embodiment, filter system 15 includes an interface 36, logic 38, a memory 40, and filters 42 coupled as shown. In certain embodiments, interface 36 interfaces with filter system 15 and image display system 22. Logic 38 includes a processor 44. Memory 40 stores processing step lists 48 that each represent a filter chain comprising one or more filters 42 coupled in sequence.

A filter chain includes a sequence of filter operations that may be used to suppress interference. Different filter operations, different filter parameters, and/or different sequences may be used to form different types of filter chains for different situations. The system may dynamically adapt in real time to changing environmental conditions.

One or more filter chains may provide time and/or frequency filtering. One or more filter chains may be used for one or more channels. For example, there may be one chain for a channel, multiple chains for a channel, or one chain for multiple channels. The same type or different types of filter chains may be used for different channels.

In an example of operation, interface 36 receives signal data packets from antenna array 20. Logic 38 generates data blocks from the data packets, and memory 40 stores processing step list. Logic 38 receives data blocks and associates each data block with a processing step list 48. Filter system 15 filters each data block according to the filter chain represented by the associated list.

In another example of operation, lists 48 may be generated, selected, or modified to adapt to different situations. Interface 36 receives instructions to generate, select, or modify a list 48. The instructions may be received from any suitable source. As an example, a user may input instructions through a user interface. As another example, an image quality monitor may determine from the quality of image 12 that an adjustment is needed, and send an instruction to make the adjustment.

The instructions may be received at any suitable time. For example, a user may select a particular setting, such as "outdoor," at the outset of imaging, and the instructions may be received at that time. As another example, a monitor may determine an adjustment is needed while system 10 is generating image 12, and send an instruction to make the adjustment.

Image display system 22 generates image data from the filtered data and displays image 12 generated from the image data. Image display system 22 may include a two- or three-dimensional display such as a screen for a computer, a helmet, and/or a television.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

System 10 may be embodied as any suitable imaging system. Examples of such imaging systems include a ground penetrating radar (GPR), a through-the-wall (TTW), an impulsive radar, and an ultra-wide band (UWB) radar system. Imaging system 10 may be used for any suitable application, for example, buried land mine detection, medical imaging, subsurface inspection, and/or other suitable application.

Figure 2:
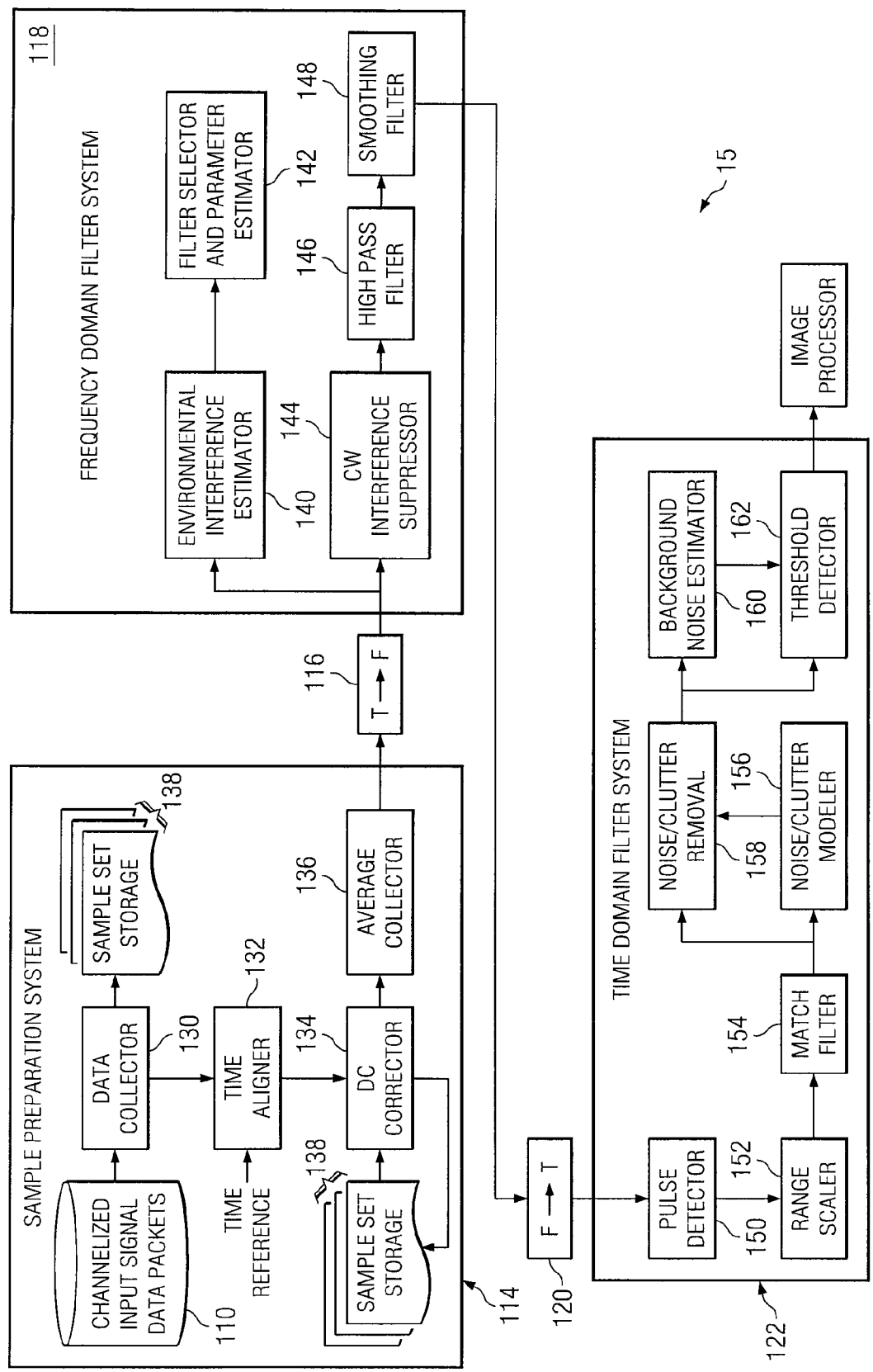
FIG. 2 illustrates one embodiment of a filter system that may be used with the imaging system of FIG. 1.

FIG. 2 illustrates one embodiment of filter system 15. In certain embodiments, filter system 15 includes a sample preparation system 114, time-to-frequency (T-F) converter 116, a frequency domain filter system 118, a frequency-to-time (F-T) converter 120, and a time domain filter system 122.

In certain embodiments, sample preparation system 114 includes a memory 110, a data collector 130, a time aligner 132, a DC corrector 134, an average collector 136, and a sample set storage 138.

Data collector 130 receives channelized signal data packets from memory 110 storing packets from receivers 134. Input to data collector 130 may include signal data (DataArrayIn), along with an instance string (INST), a logging structure (LOG), and/or a signal tag structure (TAG).

Data collector 130 may perform one or more of the following processing steps:

1. collect waveform snapshots;
2. break the contiguous signal into time aligned data blocks (DataArray) of any suitable size, for example, 1 to 32 k, 33 k to 64 k, or 64 k or greater samples;
3. read snapshot files; and/or
4. save waveforms to snapshots.

Output from data collector 130 may include processed data (DataArrayOut), along with a function status (STAT), logging structure (LOG), and/or signal tag structure (TAG). Data collector 130 may store samples in storage 138.

Time aligner 132 removes the time difference between channels. Input to time aligner 132 may include input signal (Sig1), along with instance string (INST), logging structure (LOG), and/or signal tag structure (TAG).

Time aligner 132 may perform one or more of the following processing steps:

1. create calibration waveforms (for example, with a 50 nanosecond (ns) delay) from characterized waveforms;
2. remove the DC from Sig1;
3. if using snapshots from different scope settings, shift Sig1 and zero-fill the signal;

4. determine the amount of jitter that most closely aligns SIGO to the calibrated amount, shift each channel of SIGO by the amount of jitter, and zero-fill the signal;

5. align each channel of SIGO so that sample 1 is the peak; and/or 6. zero out direct path.

Output from time aligner 132 may include time aligned signal (SIGO), along with function status (STAT), logging structure (LOG), and/or signal tag structure (TAG).

DC corrector 134 removes the DC offset. Input to DC corrector 134 may include input signal waveform (SIG), along with a multiplier weight (WGHT) for finite impulse response (FIR) polynomial interpolation, and/or one or more previous estimates of the running DC.

DC corrector 134 may perform one or more of the following processing steps:

1. calculate the DC offset;
2. if WGHT is defined, calculate the weighted DC offset;
3. if PREV is defined, append PREV with the DC offset; and/or
4. remove the DC offset from the channels.

Output from DC corrector 134 may include signal (SIGO) without the DC offset and/or the DC offset per channel (dcVAL).

Average collector 136 averages waveforms. Input to average collector 136 may include signal (Sig1), along with instance string (INST), logging structure (LOG), signal tag structure (TAG), and/or the number of waveforms used to create the average (WindowAverage).

Average collector 136 may perform one or more of the following processing steps:

1. if WindowAverage has changed, then reset/resize variables;
2. if the WindowAverage buffer is not full, then calculate and return the current average (SigAve); and/or
3. if our WindowAverage buffer is full, discard the oldest sample, shift the samples, and add the newest sample, and then calculate and return the current average (SigAve).

Output from average collector 136 may include the average of collected waveforms (SigAve), along with function status (STAT), logging structure (LOG), and/or signal tag structure (TAG).

Time-to-frequency (T-F) converter 116 converts a signal from the time domain to the frequency domain. Input to T-F converter 116 may include input signal (Sig1), along with instance string (INST), logging structure (LOG), and/or signal tag structure (TAG).

T-F converter 116 may perform one or more of the following processing steps:

1. remove DC, if not previously removed;
2. perform a fast Fourier transform (FFT) (such as a 2500 point FFT) on each channel of Sig1 to yield frequency domain signal (FSIG);
3. update TAG to indicate the that Sig1 is in the frequency domain.

Output from T-F converter 116 may include frequency domain signal (FSIG), along with function status (STAT), logging structure (LOG), and/or signal tag structure (TAG).

In certain embodiments, frequency domain filter system 118 includes an environmental interference estimator 140, a filter selector and parameter estimator 142, a coherent window (CW) interference suppressor 144, a high pass filter 146, and a smoothing filter 148.

Coherent window interference suppression (CWIS) filter 144 mitigates narrow band and low frequencies. CWIS filter suppresses sharp pulses, and may provide median filtering with threshold scaling. The filter length and/or threshold may be independently adjustable at run time.

Input to CWIS filter 144 may include frequency domain signal (FSig), along with instance string (INST), logging structure (LOG), signal tag structure (TAG), a damping factor for magnitude adjustment (Threshold), and/or a median filter tap length (Filter_Length).

CWIS filter 144 may perform one or more of the following processing steps:

1. if Threshold and Filter_Length have changed, update variables;
2. create a smoothed signal using a median filter of Filter_Length and dampen the signal according to Threshold; and/or
3. replace the FSig with the dampened signal where the Threshold is exceeded.

Output from CWIS filter 144 may include CWIS filtered signal (FSIG), along with function status (STAT), logging structure (LOG), and/or signal tag structure (TAG).

High pass filter 146 attenuates low frequencies (for example, at a cutoff frequency of 5 GHz) and/or removes direct current (DC) signals. The cutoff frequency and rise attenuation may be independently adjustable at run time.

Input to high pass filter 46 may include frequency domain signal (FSig), along with instance string (INST), logging structure (LOG), signal tag structure (TAG), a stop band frequency (sbF), and/or a frequency of full pass (tpF).

High pass filter 146 may perform one or more of the following processing steps:

1. if sbF or tpF have changed, then reset variables;
2. remove frequencies up to sbF;
3. determine slope of high pass, and factor frequencies from sbF to tpF; and/or
4. return filtered signal.

Output from high pass filter 146 may include filtered signal (FSIG), along with function status (STAT), logging structure (LOG), and/or signal tag structure (TAG).

Smoothing filter 148 mitigates narrow band interference and captures the signal at a specific temporal window. The filter window (such as Bohman window) and/or captured signal segment may be independently adjustable at run time.

Input to smoothing filter 148 may include signal (FSig), along with instance string (INST), logging structure (LOG), signal tag structure (TAG), a start frequency to start smoothing (sFStart), an ending frequency to end smoothing (sFEnd), and/or filter taps for smoothing (wWidth).

Smoothing filter 148 may perform one or more of the following processing steps:

1. if sFStart, sFEnd, or wWidth have changed, reset variables;
2. error check for valid combinations;
3. create Bohman window coefficients with wWidth; and/or
4. replace frequency span with Bohman smoothed windowing.

Output from smoothing filter 148 may include filtered signal (FSIG), along with function status (STAT), logging structure (LOG), and/or signal tag structure (TAG).

Frequency-to-time (F-T) converter 120 converts a signal from the frequency domain to the time domain. Input to F-T converter 120 may include signal (FSig), along with instance string (INST), logging structure (LOG), and/or signal tag structure (TAG). F-T converter 120 may perform one or more of the following processing steps:

1. for each channel, take the inverse FFT of FSIG to yield time domain tSig; and/or
2. take the real component of tSig to yield SIGO.

Output from F-T converter 120 may include time domain signal (SIGO), along with function status (STAT), logging structure (LOG), and/or signal tag structure (TAG).

In certain embodiments, time domain filter system 122 includes a pulse detector 150, a range scaler 152, a match filter 154, a noise and/or clutter modeler 156, a noise and/or clutter remover 158, a background noise estimator 160, and a threshold detector 162.

Pulse detector 150 detect pulses using window median filters. Input to pulse detector 150 may include input signal (Sig), along with instance string (INST), logging structure (LOG), and/or signal tag structure (TAG).

Pulse detector 50 may perform one or more of the following processing steps:

1. copy Sig to yield SIGO;
2. range scale SIGO;
3. match filter SIGO and loaded base waveform to yield Match_Filtered_Chan_Data;
4. detect pulses via small and large width window median filters of Match_Filtered_Chan_Data to yield DiffFilt;
5. cut off pulses in DiffFilt below a threshold;
6. offset pulses in DiffFilt by measured path delays (Start_DirectPath_Index) to yield SIGO; and/or
7. keep pulses within the field of view to yield SIGO.

Output from F-T converter 120 may include output pulses (SIGO), along with function status (STAT), logging structure (LOG), and/or signal tag structure (TAG).

Range scaler 52 scales the range of signals. Input to range scaler 52 may include signal (SIGO). Range scaler 52 may perform one or more of the following processing steps:

1. look up current sample distance (sD), the distance the signal travels for the sample rate; and/or
2. multiply every signal value of the waveforms by the sD and Sample Index.

Match filter 154 operates as a filter instantiation used to determine a pulse detection product. The filter weights are derived to match expected return values. In certain situations (for example, with UWB pulse signals in multipath environments), use of a match filter may be sub-optimum. The match filter, however, may provide a reasonable first estimate to determine a detection filter when dispersive and other propagation effects are unknown.

Input to range scaler 52 may include signal (SIGO) and/or a time reversed version of the BaseWaveform (BWTimeReversed). Match filter 54 may perform convolution of each channel in SIGO with BWTimeReversed to yield Match_Filtered_Chan_Data. Output from range scaler 152 may include filtered signal (Match_Filtered_Chan_Data).

Noise/clutter (N/C) modeler 156 models noise and/or clutter. Input to N/C modeler 156 may include signal (SIGO), along with the current average of saved environment samples (EnvironmentAverage); the current sum of saved environment samples (EnvironmentSum); and/or the number of waveforms that have been saved (Env_Sample_Count).

N/C modeler 156 may perform one or more of the following processing steps:

1. if an environment signal file does not exist, reset variables and save EnvironmentAverage, EnvironmentSum, and Env_Sample_Count; and/or
2. if an environment signal file exists, load the file and update variables.

Output from N/C modeler 156 may include unaltered pulse data (SIGO).

Noise/clutter (N/C) remover 158 removes noise and/or clutter. Input to N/C remover 158 may include signal (SIGO), along with the current average of saved environment samples (EnvironmentAverage).

N/C remover 158 may perform one or more of the following processing steps:

1. load the environment signal file;
2. create an envelope of the EnvironmentAverage with a kernel estimation;
3. apply the envelope to SIGO, and take the difference;
4. throw away the negative amplitudes; and/or
5. remove front end of signal, which may be indicated by a ground clutter range selector of a user interface. Output from N/C modeler 156 may include pulse data (SIGO), background environment removed Background noise estimator (BNE) 160 estimates background noise using the standard deviation of captured waveform samples. Threshold detector 162 detects pulses in light of a background noise estimate from BNE 160.

Figure 3:
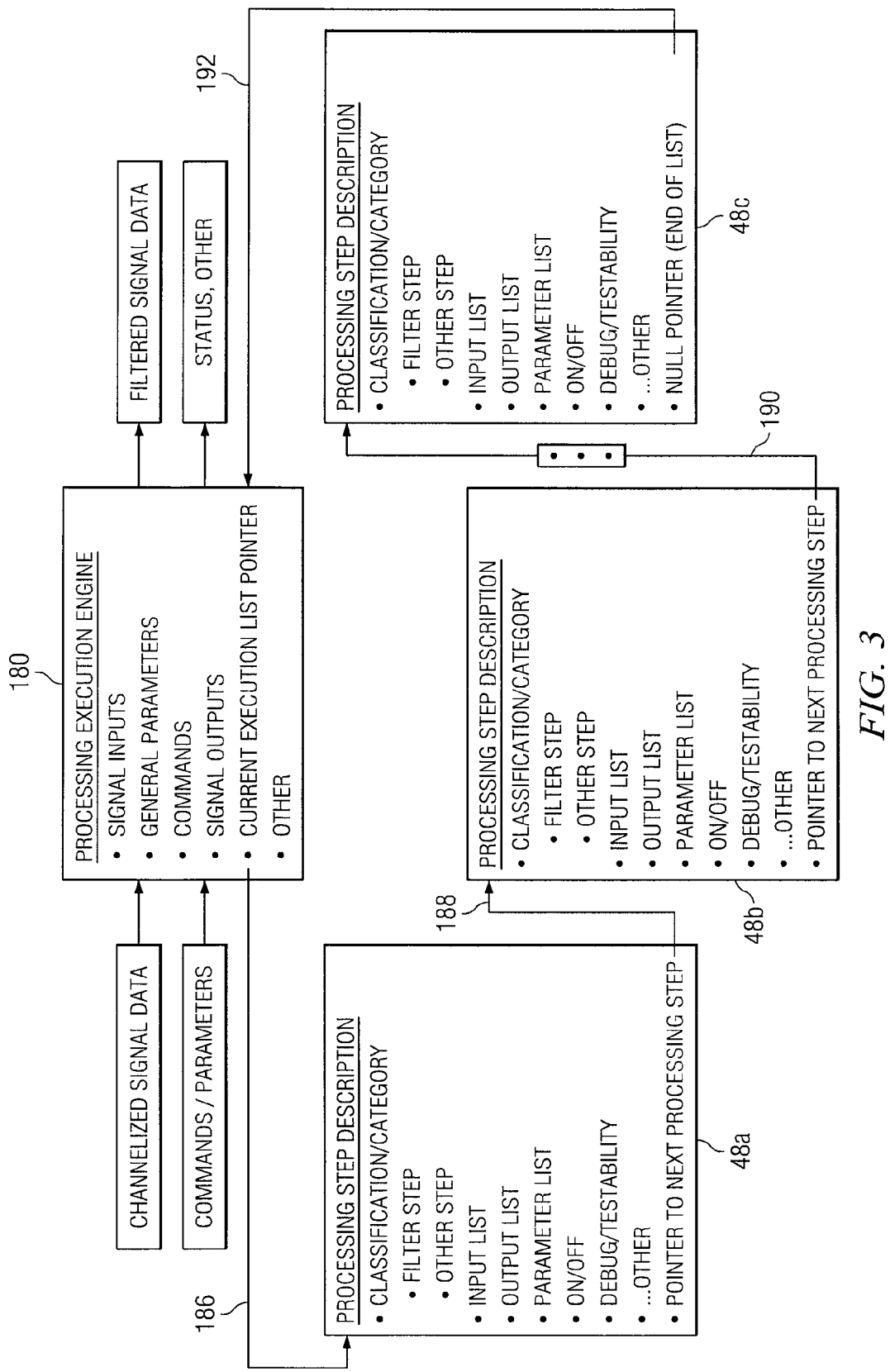
FIG. 3 illustrates an embodiment of a processing execution engine that processes signal data according to processing step descriptor lists.

FIG. 3 illustrates an embodiment of a processing execution engine 180 that processes signal data according to processing step descriptor lists 48. In certain embodiments, filter system 15 utilizes one or more processing step descriptor lists 48. A processing step descriptor list 48 includes one or more items. A list item may be a processing step that represents a filtering or other type of operation. For example, a step may be a link to a filter or other operation. A list item may also be one or more parameters to be passed with the data.

A list 48 may be modified by adding, deleting, modifying, or changing the order of the items of the list 48. For example, processing steps can be changed to represent different filtering operations or parameters. A list 48 may be modified in real time.

In certain embodiments, a processing step descriptor list 48 may represent a filter chain. For example, list may include a sequence of processing steps that represent a sequence of filtering operations of a filter chain.

In certain embodiments, processing execution engine 180 may be a processor 44 of system 10. The processing execution engine 180 receives channelized signal data and commands and parameters. Processing execution engine 180 may output filtered signal data, status, and other information.

In the illustrated embodiment, processing execution engine 180 may generate the output from the input according to the following method. At step 186, the items of first list 48a are executed in order. After the items of list 48a have been executed, the method proceeds to step 188, where the items of list 48b are executed. After the items of list 48b have been executed, the method proceeds to step 190, where the items of list 48c are executed. Execution then passes back to execution engine 180 at step 192.

Figure 4:
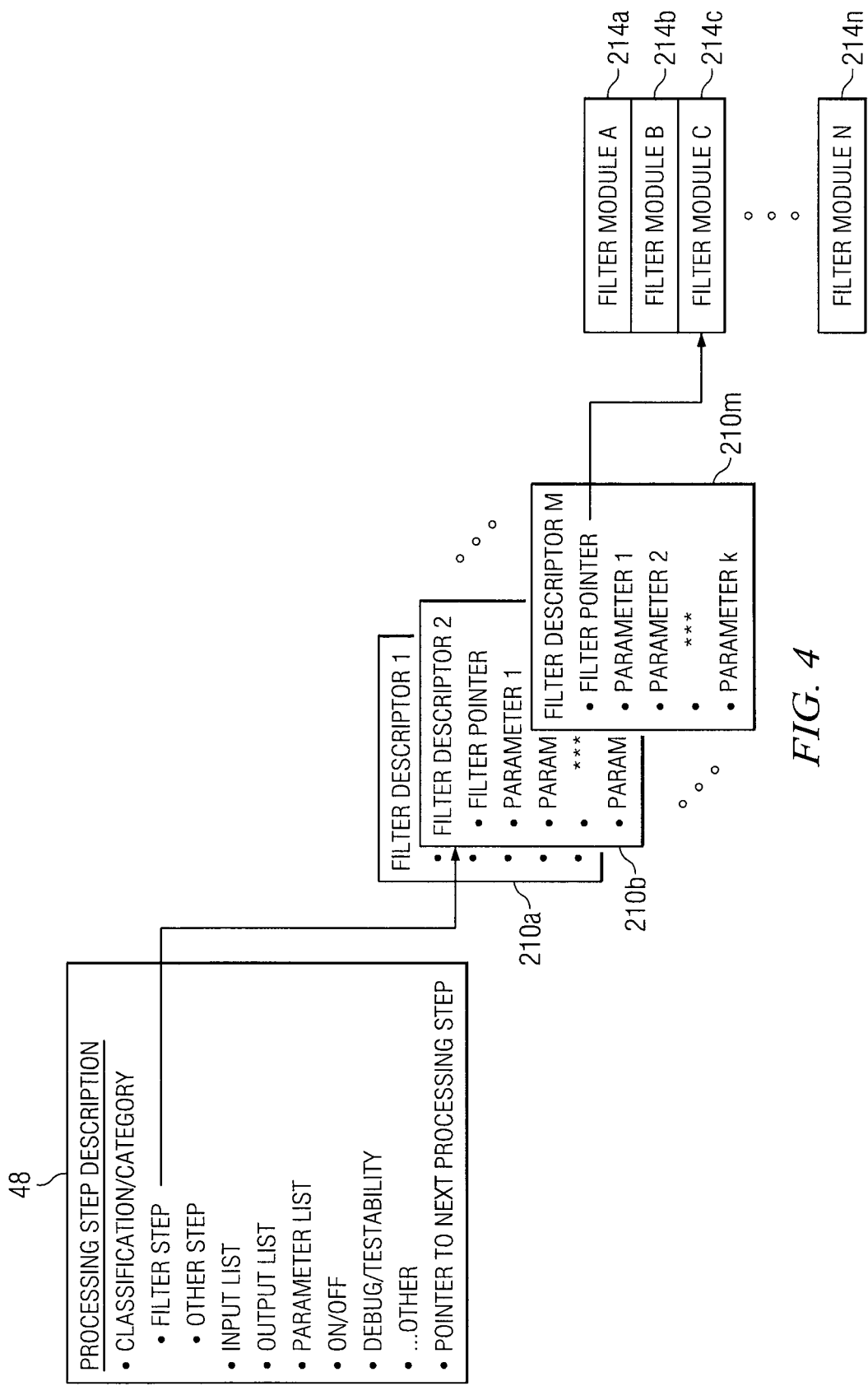
FIG. 4 illustrates a filter processing description list with filter steps that point to filter descriptors.

FIG. 4 illustrates a filter processing description list 48 with filter steps that point to one or more filter descriptors 210. In certain embodiments, system 10 utilizes one or more filter descriptors 210. A filter descriptor 210 associates a filter (such as a filter of a set of filter modules 214) with a specific set of filtering parameters. A filter descriptor can allocate more than one descriptor for use with the same filter using an alternate set of parameters.

Figure 5:
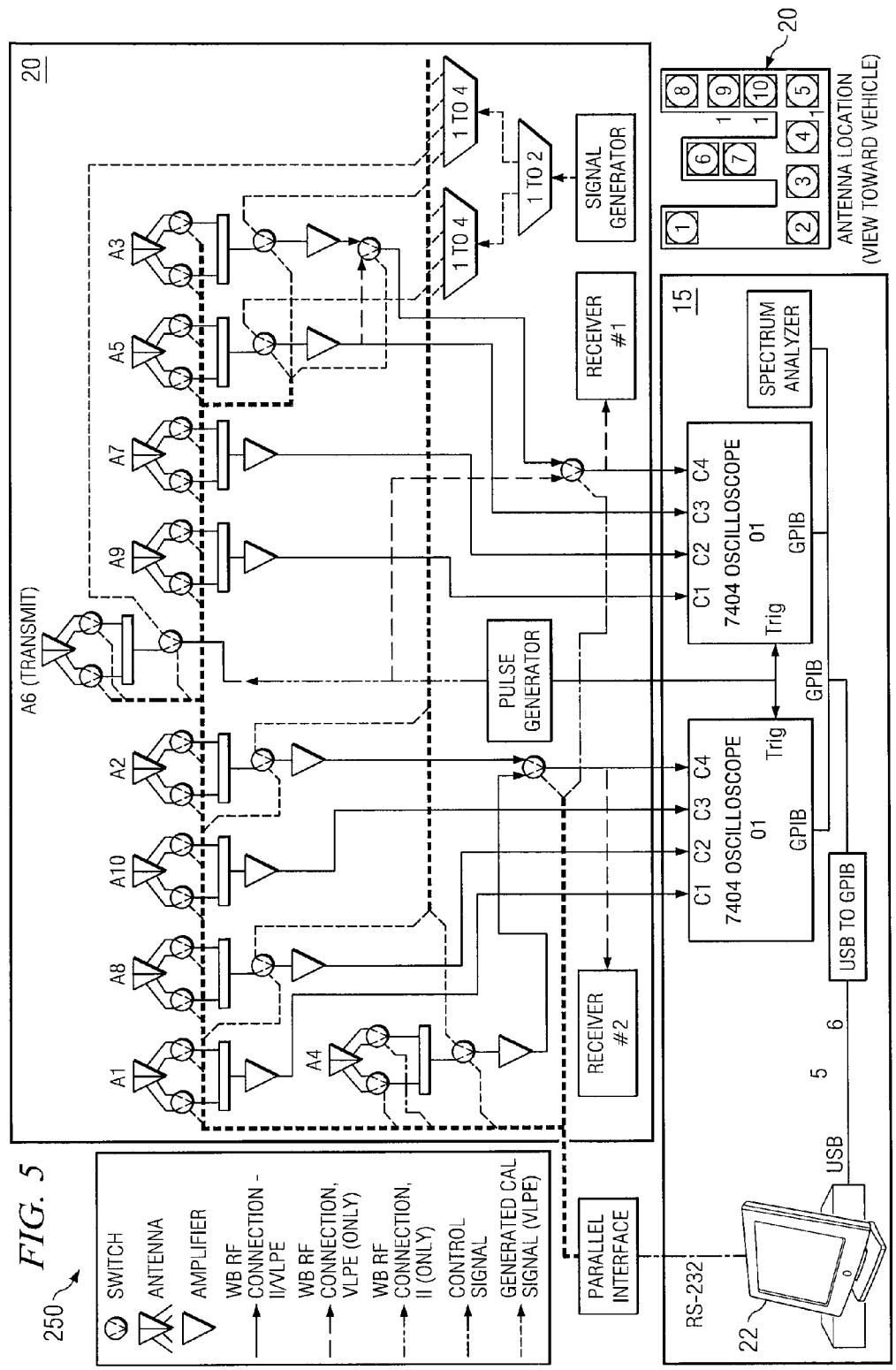
FIG. 5 illustrates an example embodiment of the imaging system of FIG. 1.

FIG. 5 illustrates an example embodiment of an imaging system 250. In the illustrated example, imaging system 250 includes antenna array 20, filter system 15, and image display system 22 coupled as shown.

Modifications, additions, or omissions may be made to the systems disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
an interface configured to receive a plurality of data blocks;
a plurality of filters, each filter configured to filter data; and
a processor configured to perform the following for each data block:
associate each data block with a processing step list of a plurality of processing step lists based on an interference or set of interferences to be suppressed, each processing step list representing a filter chain comprising at least a subset of the plurality of filters coupled in a processing sequence; and
filter each data block according to the filter chain represented by the associated processing step list by:
performing the following for each filter descriptor pointed to by the associated processing step list:
determining a filter pointed to by a subject filter descriptor of the each filter descriptor; and
filtering the data block using the filter and a specific set of filter parameters, the specific set of filter parameters associated with the subject filter descriptor of the each filter descriptor.

2. The apparatus of claim 1, the processor configured to:
receive an instruction to generate or modify a processing step list to represent a particular filter chain; and
generate or modify the processing step list in response to the instruction.

3. The apparatus of claim 1, the processor configured to:
receive an instruction to generate a processing step list to represent a particular filter chain; and
generate the processing step list in response to the instruction.

4. The apparatus of claim 1, the processor configured to:
modify a processing step list to modify the filter chain represented by the processing step list.

5. The apparatus of claim 1, a processing step list pointing to one or more filter descriptors in sequence, each filter descriptor corresponding to a filter.

6. The apparatus of claim 1, a processing step list pointing to one or more filter descriptors, each filter descriptor designating one or more filter parameters for a filter.

7. The apparatus of claim 1, a processing step list:
pointing to a first filter descriptor designating one or more filter parameters for a filter; and
subsequently pointing to a second filter descriptor designating one or more second parameters for the same filter.

8. The apparatus of claim 1, the processor configured to:
select a first filter descriptor for a processing step list to designate one or more first parameters for a filter; and
subsequently select a second filter descriptor to designate one or more second parameters for the same filter.

9. The apparatus of claim 1, the filters comprising:
one or more frequency domain filters; and
one or more time domain filters.

10. A method comprising:
receiving a plurality of data blocks at an interface; and
performing, by a processor, the following for each data block:
associating each data block with a processing step list of a plurality of processing step lists based on an interference or set of interferences to be suppressed, each processing step list representing a filter chain comprising at least a subset of a plurality of filters, the subset of filters coupled in a processing sequence; and
filtering the each data block according to the filter chain represented by the associated processing step list, the filtering the each data block according to the filter chain represented by the associated processing step list further comprising:
performing the following for each filter descriptor pointed to by the associated processing step list:
determining a filter pointed to by a subject filter descriptor of the each filter descriptor; and
filtering the data block using the filter and a specific set of filter parameters, the specific set of filter parameters associated with the subject filter descriptor of the each filter descriptor.

11. The method of claim 10, further comprising:
receiving an instruction to generate a processing step list to represent a particular filter chain; and
generating the processing step list in response to the instruction.

12. The method of claim 10, further comprising:
modifying a processing step list to modify the filter chain represented by the processing step list.

13. The method of claim 10, a processing step list pointing to one or more filter descriptors in sequence, each filter descriptor corresponding to a filter.

14. The method of claim 10, a processing step list pointing to one or more filter descriptors, each filter descriptor designating one or more filter parameters for a filter.

15. The method of claim 10, a processing step list:
pointing to a first filter descriptor designating one or more filter parameters for a filter; and
subsequently pointing to a second filter descriptor designating one or more second parameters for the same filter.

16. The method of claim 10, further comprising:
selecting a first filter descriptor for a processing step list to designate one or more first parameters for a filter; and
subsequently selecting a second filter descriptor to designate one or more second parameters for the same filter.

17. The method of claim 10, the filters comprising:
one or more frequency domain filters; and
one or more time domain filters.

* * * * *